(12) United States Patent
Bradsen et al.

(10) Patent No.: US 6,619,759 B2
(45) Date of Patent: Sep. 16, 2003

(54) BRAKE CONTROLLER

(75) Inventors: Ross Bradsen, Huntsville (CA); Peter Bell, Dwight (CA); Sean Phillips, Huntsville (CA); Michael Valliere, Huntsville (CA); David Glen, Huntsville (CA); Allan Schnurr, Huntsville (CA)

(73) Assignee: Hidden Hitch of Canada, Huntsville (CA)

( * ) Notice: Subject to any disclaimer, the term of this patent is extended or adjusted under 35 U.S.C. 154(b) by 0 days.

(21) Appl. No.: 09/994,958

(22) Filed: Nov. 27, 2001

(65) Prior Publication Data

US 2003/0098610 A1 May 29, 2003

(51) Int. Cl.⁷ .............................................. B60T 13/00
(52) U.S. Cl. .............................. 303/7; 303/20; 188/3 R; 188/206 R
(58) Field of Search ..................... 303/7, 123, 124, 303/20, 3, 24.1; 188/205 R, 3 R, 3 H, 112 R, 112 A, 156, 161, 163, 206 R; 701/22, 70; D12/179; 248/176.1, 176.3; 340/479, 461

(56) References Cited

U.S. PATENT DOCUMENTS

| | | | |
|---|---|---|---|
| 5,002,343 A | 3/1991 | Brearley et al. | |
| 5,050,938 A | 9/1991 | Brearley et al. | |
| 5,080,445 A | 1/1992 | Brearley et al. | |
| 5,615,930 A | 4/1997 | McGrath et al. | |
| 5,620,236 A | 4/1997 | McGrath et al. | |
| 5,782,542 A | 7/1998 | McGrath et al. | |
| 5,785,393 A | 7/1998 | McGrath et al. | |
| 5,800,025 A | 9/1998 | McGrath et al. | |
| 6,039,410 A | 3/2000 | Robertson et al. | |
| 6,179,390 B1 | 1/2001 | Guzorek et al. | |
| 6,419,055 B1 * | 7/2002 | Walsh et al. ............ 188/206 R |

* cited by examiner

Primary Examiner—Douglas C. Butler
(74) Attorney, Agent, or Firm—Harness, Dickey & Pierce, PLC

(57) ABSTRACT

An electronic brake controller operates in both an automatic and manual mode. In the automatic mode, the electronic brake controller applies a pre-specified percentage of braking for the brakes of a towed vehicle. In the manual mode, the electronic brake controller is capable of applying one-hundred percent of braking regardless of the setting for the pre-specified percentage of braking set for the automatic mode.

14 Claims, 3 Drawing Sheets

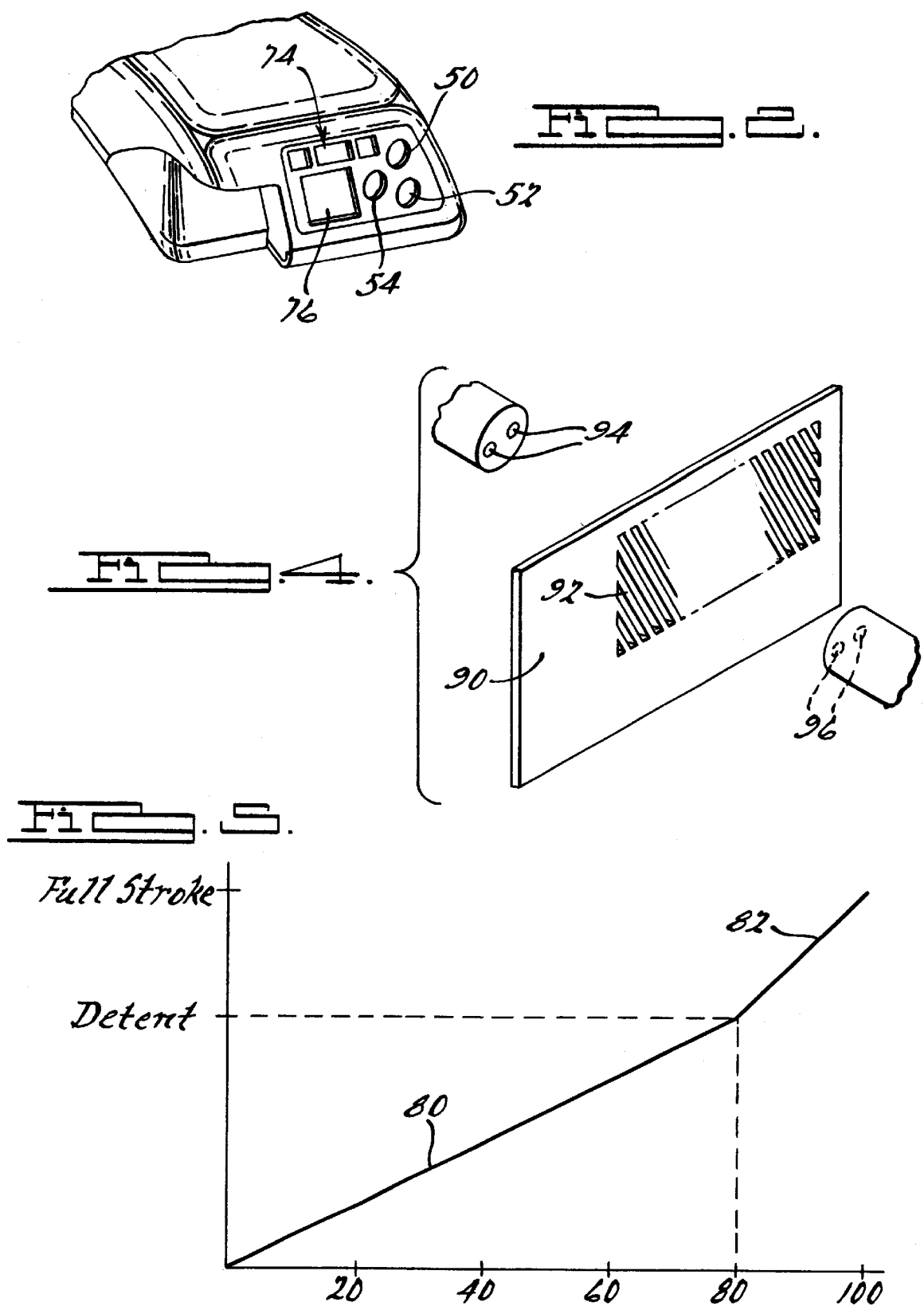

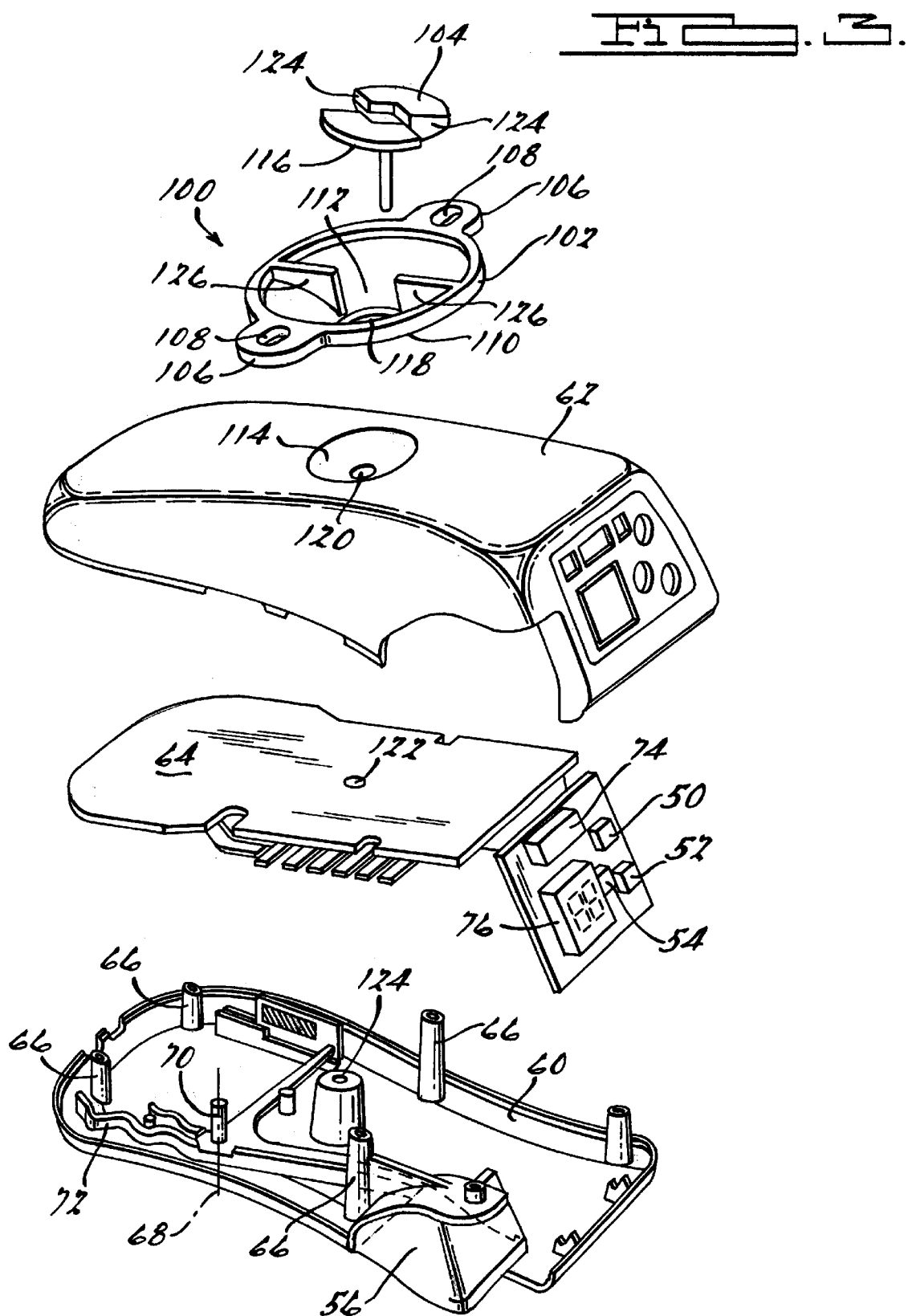

BRAKE CONTROLLER

FIELD OF THE INVENTION

The present invention relates to brake controllers for electrical braking systems on a towed vehicle. More particularly, the present invention relates to a unique control housing assembly for use with the electrical braking system.

BACKGROUND OF THE INVENTION

Towed vehicles, such as recreational and utility trailers which are designed to be towed by automobiles and light-duty trucks, are commonly provided with electric brakes. The electric brakes generally include a pair of brake shoes which, when actuated, frictionally engage a brake drum. An electromagnet is mounted on one end of a lever to activate the brake shoes. When an electric current is supplied to the electromagnet, the electromagnet is drawn against the rotating drum which pivots the lever to actuate the brakes. Typically, the braking force produced by the brake shoes is proportional to the electric current applied to the electromagnet. This electric current can be relatively large. For example, the electric brakes on a two-wheeled trailer can draw six amperes of current when actuated and the electric brakes on a four-wheel transfer can draw twelve amperes of current.

Automobile industry standards require that electrically actuated vehicle brakes be driven against the ground potential of the vehicle power supply. Accordingly, one pole of each of the towed vehicle brake electromagnets is electrically connected to the towed vehicle ground and the towed vehicle ground is electrically grounded to the towing vehicle ground. The other pole of each of the brake electromagnets is electrically connected through an electric brake controller to the towing vehicle power supply.

Various electric brake controllers for towed vehicle electric brakes are known in the art. For example, a variable resistor, such as a rheostat, can be connected between the towing vehicle power supply and the brake electromagnets. The towing vehicle operator manually adjusts the variable resistor setting to vary the amount of current supplied to the brake electromagnets and thereby control the amount of braking force developed by the towed vehicle brakes.

Also known in the art are more sophisticated electric brake controllers which include electronics to automatically supply current to the brake electromagnets when the towing vehicle brakes are applied. Such electronic brake controllers typically include a sensing unit which generates a brake control signal corresponding to the desired braking effort. For example, the sensing unit can include a pendulum which is displaced from a rest position when the towing vehicle decelerates and an electronic circuit which generates a brake control signal which is proportional to the pendulum displacement. Alternatively, the hydraulic pressure in the towing vehicle's braking system or the pressure applied by the driver's foot to the towing vehicle's brake can be sensed to generate the brake control signal.

Other brake controllers are designed to generate an output signal for actuating the electric wheel brakes of the towed vehicle when a signal is received which indicates the towing vehicle's brakes are being applied. The strength of the output signal and thus the amount of braking is selected by the operator of the vehicle. Typically, the strength is incrementally adjustable between a plurality of individual strength settings. A display of some type is utilized to indicate the strength of braking that has been selected. This type of a brake controller may also include a device for producing a manual brake control signal which overrides the automatically generated brake control signal. The device is actuated by the operator to generate the braking signal when the operator wants the towed vehicle electric brakes applied when the towing vehicle's brakes are not applied.

While these prior art brake controllers have performed adequately in the prior art, the continued development of these controllers has been directed to simplification and lowering of the costs for these controllers.

SUMMARY OF THE INVENTION

The present invention provides the art with a controller that utilizes computer mouse technology to determine the level of braking to be applied. By utilization of computer mouse technology, the controller of the present invention utilizes digital control rather than the potentiometer systems of the prior art. By using digital control rather than the prior art potentiometer systems, the controller of the present invention can be programmed to apply one-hundred percent of trailer braking regardless of where the maximum set percentage of braking is set.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 2 is a front perspective view of the controller illustrated in FIG. 1.

FIG. 3 is an exploded perspective view of the controller illustrated in FIGS. 1 and 2.

FIG. 4 is a schematic illustration of the unique system which allows the incorporation of computer mouse technology into the controller.

FIG. 5 is a graph illustrating an example of the control of braking percentage in accordance with the present invention.

DETAILED DESCRIPTION OF THE PREFERRED EMBODIMENTS

Figure 1:
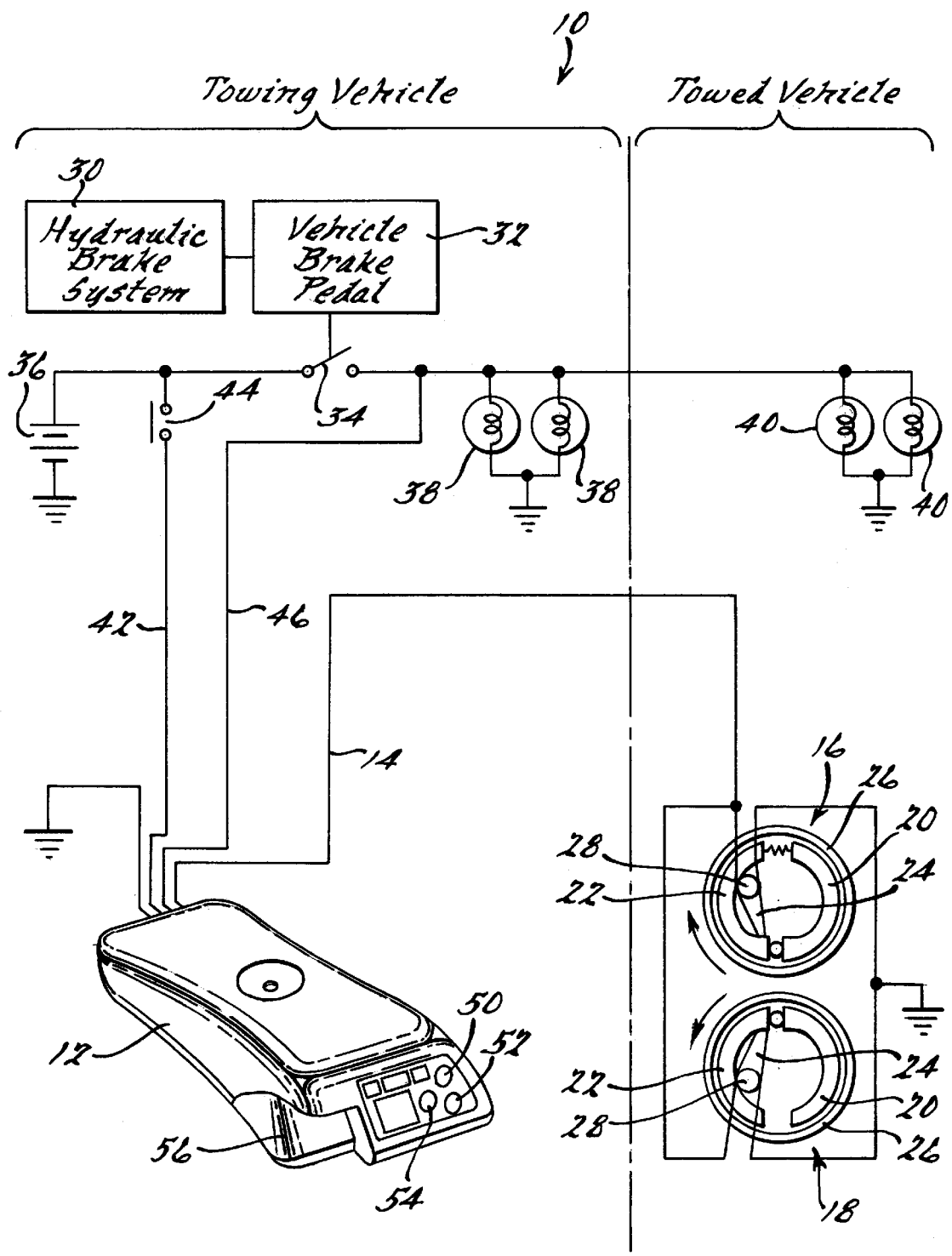
FIG. 1 is a schematic diagram illustrating an electrical brake system which includes an electronic brake controller in accordance with the present invention.

The following description of the preferred embodiment(s) is merely exemplary in nature and is in no way intended to limit the invention, its application, or uses.

Referring now to the drawings in which like reference numerals designate like or corresponding parts throughout the several views, there is shown in FIG. 1 a schematic diagram illustrating an electric brake system for a towed vehicle and which is designated generally by the reference numeral 10. Electric brake system 10 utilizes an electronic brake controller 12 embodying the principles of the present invention. Brake controller 12 is typically located in a towing vehicle usually being mounted beneath the dashboard of the towing vehicle. When actuated, controller 12 functions to supply an electric current through an electrical line 14 to energize brakes 16 and 18 which brake the wheels of the towed vehicle.

Electric brakes 16 and 18 each typically include a pair of brake shoes 20 and 22 which, when actuated by a lever 24 are expanded into contact with a brake drum 26 for braking the wheels of the towed vehicle. A separate electromagnet 28 is typically mounted on an end of each of the brake actuating levers 24. Each electromagnet 28 is positioned to abut the generally flat side of brake drum 26. As an electric current is passed though each of the electromagnets 28, electromagnets 28 are drawn into contact with brake drums 26 and the resulting drag pivots levers 24 to engage brake shoes 20 and 22 in a conventional manner. It will be appreciated that while FIG. 1 shows two sets of brakes 16 and 18, the present invention can also be applied to towed vehicles having more than two sets of brakes.

The towing vehicle typically includes a conventional hydraulic brake system 30 which is actuated when a brake pedal 32 is depressed by a driver of the towing vehicle. Brake pedal 32 is coupled to a brake light switch 34. When brake pedal 32 is depressed, switch 34 is closed and power from a vehicle power supply 36, shown as a storage battery in FIG. 1, is supplied to one or more towing vehicle brake lights 38 and one or more towed vehicle brake lights 40. Vehicle power supply 36 is also connected by a first electrical line 42 through a circuit breaker 44 to controller 12. Power is continuously supplied to controller 12 through electrical line 42. It will be appreciated that, while circuit breaker 44 is shown in FIG. 1, a fuse or other over-current protection devices could be used. A second electrical line 46 connects the brake light side of brake light switch 34 to controller 12. Thus, power is also supplied through second electrical line 46 to controller 12 when brake light switch 34 is closed.

Brake controller 12 is normally operated in an automatic mode wherein the towed vehicle brakes 16 and 18 are automatically actuated by controller 12 when the towing vehicle brakes are actuated. The automatic mode is activated upon the closure of brake light switch 34. When controller 12 senses braking force being applied to the towing vehicle, it supplies an electric current through electrical line 14 to actuate the towed vehicle brakes 16 and 18. The amount of electric current can be directly proportional to the braking force applied to the towing vehicle, if desired. The amount of braking force applied by brakes 16 and 18 typically ramps up from zero percent of braking to a maximum percent of braking. The maximum percent of braking is typically set at a point less than one-hundred percent of braking and this maximum percent is selectable using a set of three buttons 50, 52 and 54 located on controller 12 as described below. In addition, a time delay can be programmed into controller 12. The amount of time delay is also selectable using buttons 50–54 as described below.

In some instances, it may be desired to actuate only towed vehicle brakes 16 and 18. This may be desirable, for example, to stabilize the towed vehicle against vacillations or swinging caused by strong side winds. Therefore, brake controller 12 also includes a manual mode of operation. Accordingly, a manual switch 56 is provided on controller 12 to allow the vehicle driver to actuate towed vehicle brakes 16 and 18 without applying the towing vehicle brakes. Pressing manual switch 56 initiates the manual mode of operation. The amount of electric current supplied to towed vehicle brakes 16 and 18 is proportional to the amount of displacement of manual switch 56 as described below. If manual switch 56 is pressed while brake pedal 32 is depressed, the manual operating mode overrides the automatic operating mode.

Referring now to FIGS. 2–5, controller 12 is illustrated in greater detail. Controller 12 comprises a lower housing 60, an upper housing 62, a control circuit board 64 and manual switch 56. Control circuit board 64 is positioned between housings 60 and 62. A set of locating tabs 66 control the positioning of control circuit board 64 with respect to housings 60 and 62. Manual switch 56 is also positioned between housings 60 and 62. Manual switch 56 defines a pivot axis 68 which engages corresponding positioning tabs 70 on housings 60 and 62. Tabs 70 pivotingly support manual switch 56 such that manual switch 56 pivots on axis 68. An integral spring 72 engages a reaction point on housing 60 to bias manual switch 56 to its most outward position with respect to housings 60 and 62.

The three buttons 50–54 located on controller 12 actuate three switches, respectively, located on control circuit board 64. The three buttons are utilized as follows. Button 50 switches a corresponding switch on control circuit board 64 to increase a selected parameter. Button 52 switches a corresponding switch on control circuit board 64 to decrease a selected parameter. Button 54 switches a corresponding switch on control circuit board to select the parameter to be controlled by buttons 50 and 52. Button 54 switches controller 12 between a run condition, a power set condition and a delay set condition. Repeated pressing of button 54 will cause controller 12 to sequence between these three conditions. When in its run condition, controller 12 operates to both automatically and manually control electric brakes 16 and 18.

When controller 12 is in its power set condition, the amount of power supplied to brakes 16 and 18 through electrical line 14 is controlled which in turn controls the percent braking for brakes 16 and 18. When controller 12 is in its power set condition, either a plurality of LED's 74 or a display 76 consisting of two seven segment display devices illustrate the amount of full power which will be applied to brakes 16 and 18 by controller 12 in its automatic mode. The use of LED's 74 or display 76 is determined by which model of controller 12 is being used. When using LED's 74, the number of LED's 74 which are lit is directly proportional to the full power braking. When all LED's 74 are lit, the full power setting for controller 12 is set at the maximum lever which is built into control circuit board 64 and which may or may not be one-hundred percent of braking. When using display 76, the two seven segment display devices will numerically indicate the full power level to be supplied to brakes 16 and 18 through electrical line 14 by controller 12 in its automatic mode. When controller 12 is in its power set condition, pressing button 50 will increase the power level and pressing button 52 will decrease the power level as indicated by LED's 74 or display 76.

The full power setting for controller 12 will also control the power level to be supplied to brakes 16 and 18 during the manual mode for controller 12. Manual switch 56, when pressed, will move from its full out position to its full in position against the urging of integral spring 72. Between its full out position and its full in position, manual switch 56 will engage a detent. Between its full out position and the detent, the power level supplied to brakes 16 and 18 through electrical line 14 will ramp up from zero percent of braking to the preset maximum power level. Between the detent and its full in position, the power level supplied to brakes 16 and 18 through electrical line 14 will ramp up from the preset maximum power level to one-hundred percent braking for brakes 16 and 18. The amount of braking between zero and the preset maximum power level and the maximum power level and one-hundred percent is directly related to the position of manual switch 56.

This two-step feature is illustrated in FIG. 5 where the preset maximum power level generates eighty percent of braking for brakes 16 and 18. In FIG. 5, line 80 represents the amount of braking applied in relation to the position of manual switch 56 between its normal position and the detent. Thus, the amount of braking for brakes 16 and 18 will ramp from zero percent braking to eighty percent braking as manual switch 56 moves from its normal position to the detent. Line 82 of FIG. 5 represents the amount of braking applied in relation to the position of manual switch 56 between its detent and its full stroke position. Thus, the amount of braking for brakes 16 and 18 will ramp from eighty percent braking to one-hundred percent braking as manual switch 56 moves from the detent to its full stroke position. This unique two step feature for the manual operational mode of controller 12 allows the towing vehicle driver to apply one-hundred percent braking for brakes 16 and 18 regardless of the preset maximum power level for controller 12. During the automatic mode, controller 12 will only apply the preset maximum power level to brakes 16 and 18. The added braking between the preset maximum level and one-hundred percent braking can only be applied in the manual mode.

In some instances, it may be desirable to have a time delay between application of the towing vehicle brakes and application of the towed vehicle brakes. This will allow momentary application of the towing vehicle brakes without application of the towed vehicle brakes. When controller 12 is in its delay set condition, either the plurality of LED's 74 or display 76 will illustrate the amount of delay for controller 12 when it operates in its automatic mode. It should be noted that there is no braking delay when controller 12 is in its manual mode. When using LED's 74, the number of LED's 74 which are lit is directly proportional to the full time delay. When all LED's 74 are lit, the maximum time delay is programmed into controller 12. When using display 76, the two seven segment display devices will numerically indicate the amount of time delay programmed into controller 12. When controller 12 is in its delay set condition, pressing button 50 will increase the delay and pressing button 52 will decrease the delay as indicated by LED's 74 or display 76.

Controller 12 utilizes digital circuitry rather than the prior art potentiometers to control the power being supplied to brakes 16 and 18 through electrical line 14. The digital circuitry is similar to that used in a computer mouse for controlling the position of the cursor on the screen.

When a computer mouse is moved, a set of wheels having spokes are rotated. The spoked wheels have a pair of lights and a pair of receivers which sense the amount of and direction of rotation of the spoked wheels. The breaking of the light beams by the spokes of the wheels is sensed by the receivers and this information is processed by the electronic circuitry in order to control the position of the cursor on the computer's monitor.

Referring now to FIG. 4, controller 12 utilizes a similar method of determining how far manual switch 56 has been depressed. Instead of utilizing a spoked wheel and having a light beam broken by the spokes of the wheel, the present invention utilizes a planar shaped comb like component 90 where the teeth 92 of comb like component 90 break the light beams 94 when comb like components 90 is moved longitudinally. The breaking of light beam 94 is sensed by a pair of receivers 96. Two light beams 94 are utilized in order for controller 12 to identify the direction of movement for comb like component 90.

One problem which needed to be resolved with the incorporation of comb like component 90 is that comb like component 90 must always be moved in a direction which allows teeth 92 to break light beam 94. If comb like component 90 is moved in a direction parallel to teeth 92, teeth 92 will not break light beams 94 and movement of comb like component 90 cannot be sensed by light beams 94 and receivers 96 in a manner similar to computer mouse technology. To overcome this problem, the inventors of the present invention designed teeth 92 to be at an acute angle with respect to the longitudinal direction of component 90. Thus, movement in the longitudinal direction of component 90 and movement perpendicular to the longitudinal direction of component 90 can be sensed in a manner similar to computer mouse technology using light beams 94 and receivers 96.

In addition to the above detailed features, controller 12 also incorporates electronic circuit protection. Control circuit board 64 incorporates circuitry which detects when controller 12 experiences an incorrect ground and also when incorrect wiring of controller 12 is present. When LED's 74 are utilized, LED's 74 will flash indicating that an incorrect ground and/or incorrect wiring for controller 12 is present. When display 96 is utilized, display 96 will indicate SC (shirt circuit) when an incorrect ground is present and WW (wrong wiring) when incorrect wiring is present.

Referring now to FIG. 3, controller 12 utilizes a unique mounting system 100 which provides for pivoting and/or rotational movement of controller 12 around all three axes associated with controller 12. Mounting system 100 comprises a mounting bracket 102 and a mounting pin 104. Mounting bracket 102 is a generally circular bracket having two tabs 106 extending from the center circular section. Each tab 106 defines an aperture 108 which is utilized to secure bracket 102 and thus controller 12 to the towing vehicle. Bracket 102 defines an exterior partial spherical surface 110 and an internal partial spherical surface 112. External spherical surface 110 mates with a spherical surface 114 formed into housing 62. The sliding interface between surfaces 110 and 114 allows for the adjustment of the position of controller 12 in relation to bracket 102 and thus to the mounting location of the towing vehicle.

Mounting pin 104 defines a partially spherical surface 116 which mates with internal partially spherical surface 110 on bracket 102. Thus, bracket 102 is sandwiched between mounting pin 104 and housing 62 and movement of controller 12 with respect to bracket 102 is controlled by the interface between surfaces 110 and 114 and by the interface between surfaces 112 and 116. Mounting pin 104 extends through an aperture 118 in bracket 102, an aperture 120 in housing 62, an aperture 122 in control circuit board 64 and an aperture 124 in housing 60. The end of mounting pin 104 extending through housing 60 is secured using methods well known in the art which then pivotally secures controller 12 to bracket 102. Mounting pin 104 is allowed to rotate with respect to mounting bracket 102. A set of slots 124 in mounting pin 104 engage a set of ribs 126 on mounting bracket 102 to limit the amount of movement of controller 12 with respect to mounting bracket 102.

Thus, the interface between spherical surfaces 110 and 114 in conjunction with the interface between spherical surfaces 112 and 116 provide for the pivoting of controller 12 with respect to mounting bracket 102 around two of the three axes. Movement of controller 12 around the third axis is controlled by mounting pin 104 in conjunction with slots 124 and ribs 126.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electronic brake controller for actuating electric wheel brakes of a towed vehicle, the electronic brake controller comprising:

a sensor for producing a first brake control signal which is representative of a desired automatic braking level for the towed vehicle;

a manually operated switch movable from a first position to a second position to produce a second brake control signal which is representative of a first manual braking level, said first manual braking level being between zero braking level and the desired automatic braking level, said manually operated switch being movable from said second position to a third position to produce a third brake control signal which is representative of a second manual braking level, said second manual braking level being between the desired automatic braking level and a one-hundred percent braking level, said manually operated switch including a detent for defining said second position; and a control device adapted to be connected to a vehicle power source and responsive to said first, second and third brake control signals for generating an output signal for actuating the electric brakes of the towed vehicle.

2. The electronic brake controller described in claim 1 further comprises means for selecting said desired automatic braking level.

3. The electronic brake controller described in claim 2 further comprising means for displaying said desired automatic braking level.

4. The electronic brake controller described in claim 3 wherein said displaying means comprises a plurality of LED's.

5. The electronic brake controller described in claim 3 wherein said displaying means comprises a seven segment display.

6. The electronic brake controller described in claim 2 wherein said selecting means comprises a plurality of buttons.

7. The electronic brake controller described in claim 1 wherein said manually operated switch comprises a lever, an integral portion of said lever forming a biasing member, said biasing member urging said manually operated switch into its first position.

8. The electronic brake controller as described in claim 1 wherein movement of said manually operated switch is sensed by the breaking of a light beam by a comb-like component.

9. The electronic brake controller as described in claim 8 wherein said comb-like component moves in a longitudinal direction; said comb-like component including a plurality of teeth.

10. The electronic brake controller as described in claim 9 wherein said plurality of teeth are disposed at an acute angle with respect to said longitudinal direction.

11. The electronic brake controller as described in claim 1 further comprising a mounting system adapted to attach said controller to a vehicle, said mounting system comprising a mounting bracket and a mounting pin.

12. The electronic brake controller as described in claim 11 wherein said mounting bracket defines an exterior spherical surface and an internal spherical surface, said external spherical surface engaging a spherical surface defined by said controller, said internal spherical surface engaging a spherical surface defined by said mounting pin.

13. An electronic brake controller for actuating electric wheel brakes of a towed vehicle, the electronic brake controller comprising:

a sensor for producing a first brake control signal which is representative of a desired automatic braking level for the towed vehicle;

a manually operated switch movable from a first position to a second position to produce a second brake control signal which is representative of a first manual braking level, said first manual braking level being between zero braking level and the desired automatic braking level, said manually operated switch being movable from said second position to a third position to produce a third brake control signal which is representative of a second manual braking level, said second manual braking level being between the desired automatic braking level and a one-hundred percent braking level; and a control device adapted to be connected to a vehicle power source and responsive to said first, second and third brake control signals for generating an output signal for actuating the electric brakes of the towed vehicle; wherein said manually operated switch comprises a lever, an integral portion of said lever forming a biasing member, said biasing member urging said manually operated switch into its first position.

14. An electronic brake controller for actuating electric wheel brakes of a towed vehicle, the electronic brake controller comprising:

a sensor for producing a first brake control signal which is representative of a desired automatic braking level for the towed vehicle;

a manually operated switch movable from a first position to a second position to produce a second brake control signal which is representative of a first manual braking level, said first manual braking level being between zero braking level and the desired automatic braking level, said manually operated switch being movable from said second position to a third position to produce a third brake control signal which is representative of a second manual braking level, said second manual braking level being between the desired automatic braking level and a one-hundred percent braking level; and a control device adapted to be connected to a vehicle power source and responsive to said first, second and third brake control signals for generating an output signal for actuating the electric brakes of the towed vehicle; wherein movement of said manually operated switch is sensed by the breaking of a light beam by a comb-like component.

* * * * *